US010883939B2

(12) United States Patent
Van Dorpe et al.

(10) Patent No.: US 10,883,939 B2
(45) Date of Patent: Jan. 5, 2021

(54) IMAGING APPARATUS AND METHOD FOR IMAGING AN OBJECT

(71) Applicant: IMEC VZW, Leuven (BE)

(72) Inventors: Pol Van Dorpe, Spalbeek (BE); Niels Verellen, Heverlee (BE)

(73) Assignee: IMEC VZW, Leuven (BE)

( * ) Notice: Subject to any disclaimer, the term of this patent is extended or adjusted under 35 U.S.C. 154(b) by 79 days.

(21) Appl. No.: 16/442,484

(22) Filed: Jun. 15, 2019

(65) Prior Publication Data
US 2019/0383743 A1     Dec. 19, 2019

(30) Foreign Application Priority Data

Jun. 15, 2018   (EP) .................................... 18177907

(51) Int. Cl.
*G01N 21/64*     (2006.01)
*G01N 15/02*     (2006.01)
*G01N 21/77*     (2006.01)

(52) U.S. Cl.
CPC ..... *G01N 21/6458* (2013.01); *G01N 15/0227* (2013.01); *G01N 21/648* (2013.01); *G01N 21/7703* (2013.01)

(58) Field of Classification Search
CPC .. G01N 21/648; G01N 21/7703; G01N 21/64; G01N 21/645; G01N 21/6458
See application file for complete search history.

(56) References Cited

U.S. PATENT DOCUMENTS

| 3,975,084 A | 8/1976 | Block |
| 10,634,890 B1 * | 4/2020 | Kasten ................... G02B 27/32 |

(Continued)

FOREIGN PATENT DOCUMENTS

WO     2017/199025 A1     11/2017

OTHER PUBLICATIONS

Coucheron, David A. et al., "Chip-Based Nanoscopy: Towards Integration and High-Throughput Imaging", Proceedings of SPIE 10350, Nanoimaging and Nanospectroscopy V, 103500W, Dec. 14, 2017, 8 pages.

(Continued)

*Primary Examiner* — David P Porta
*Assistant Examiner* — Fani Boosalis
(74) *Attorney, Agent, or Firm* — McDonnell Boehnen Hulbert & Berghoff LLP (57) ABSTRACT

An imaging apparatus comprises: (i) an illumination waveguide configured to propagate light by total internal reflection, wherein an evanescent field illuminates an object in close relation to the illumination waveguide; (ii) an array of light-sensitive areas arranged on a common substrate with the illumination waveguide for detecting light from the object; and (iii) a controller configured to control forming of an interference pattern in the illumination waveguide, wherein the interference pattern comprises at least one element of constructive interference for selectively illuminating a portion of the object, the at least one element having a dimension with a size in a range of 100 nm-10 µm; wherein the controller is configured to sequentially change the interference pattern in relation to the object such that different portions are illuminated and light from different portions is sequentially detected.

20 Claims, 3 Drawing Sheets

(56) References Cited

U.S. PATENT DOCUMENTS

2015/0141267 A1* 5/2015 Rothberg ............ C12Q 1/6874
506/2
2016/0011112 A1* 1/2016 Tappura ............ G01N 21/6428
506/9

OTHER PUBLICATIONS

Diekmann, Robin et al., "Chip-Based Wide Field-of-View Nanoscopy", Nature Photonics, vol. 11, May 2017, 9 pages.
Yeh, L.-H. et al., "Structured Illumination Microscopy with Unknown Patterns and a Statistical Prior", Biomedical Optics Express, vol. 8, No. 2, Feb. 1, 2017, pp. 695-711.

* cited by examiner

IMAGING APPARATUS AND METHOD FOR IMAGING AN OBJECT

CROSS-REFERENCE TO RELATED APPLICATION

The present application is a non-provisional patent application claiming priority to European Patent Application No. 18177907.5 filed Jun. 15, 2018, the contents of which are hereby incorporated by reference.

TECHNICAL FIELD

The present disclosure relates to an imaging apparatus and a method for imaging an object. In particular, the present disclosure relates to high resolution microscopy.

BACKGROUND

Fluorescence microscopy is commonly used for studying samples in cell and molecular biology. The sample may be prepared by providing a fluorescent substance (fluorophore), that may be selectively bound to a part of the sample that is to be analyzed. Alternatively, an intrinsic fluorescence of the sample may be used in exciting fluorescent light from the sample.

Fluorescence microscopy may, for instance, be used in DNA sequencing. Although DNA sequencing has traditionally been performed in specialized locations using large, expensive equipment, there is a growing interest in enabling DNA sequencing in smaller laboratories and in hospital settings.

Resolution of fluorescent imaging techniques is intrinsically limited by the diffraction limit. Therefore, there is an interest in super-resolution techniques for improving resolution, enabling more detailed imaging of objects, and also enabling objects, such as DNA sequences, to be more densely arranged while being imaged. However, super-resolution techniques normally suffer from bulky optical setups and, hence, are expensive.

It is presently known to use techniques for selectively exciting fluorophores that are surface bound. For instance, using total internal reflection microscopy (TIRF), evanescent excitation may be used for exciting only a thin portion of a sample at the surface of the sample holder. The evanescent excitation is based on a small portion of light escaping a surface in which total internal reflection occurs and intensity of the light will very quickly decrease with distance from the surface. Thus, a high vertical resolution may be obtained using TIRE illumination.

In Diekmann R., Helle, Ö. I., Öie C. I., McCourt P., Huser T. R., Schüttpelz M., and Ahluwalia B. S., "Chip-based wide field-of-view nanoscopy," Nature Photonics, vol. 11, pages 322-328 (2017), the use of a complex, but mass-producible optical chip, which hosts the sample and provides a waveguide for the illumination source, and a standard low-cost microscope to acquire super-resolved images is disclosed. Waveguides composed of a material with high refractive-index contrast provide a strong evanescent field that is used for single-molecule switching and fluorescence excitation, thus enabling chip-based single-molecule localization microscopy. Additionally, multimode interference patterns induce spatial fluorescence intensity variations that enable fluctuation-based super-resolution imaging.

The field of view may be flexibly scaled by directly switching magnification/numerical aperture of an objective lens of the fluorescence imaging. However, the imaging is still bulky and requires a microscope for collecting the fluorescence. Also, the field of view is limited by a width of the waveguide, which is formed as a channel for guiding light and shown to be up to 0.5 mm wide. Further, an external illumination unit needs to be manually controlled for changing light that is coupled to an input facet of the waveguide.

SUMMARY

The present disclosure may enable improved imaging of objects using a compact imaging set-up.

According to a first aspect, there is provided an imaging apparatus, the apparatus comprising: (i) an illumination waveguide, which is configured to propagate one or more light waves by total internal reflection, wherein an evanescent field of the propagated light wave is configured to illuminate an object in close relation to the illumination waveguide; (ii) an array of light-sensitive areas, the array being configured to detect light from the object, wherein the array of light-sensitive areas is arranged on a common substrate with the illumination waveguide; and (iii) a controller, which is configured to control forming of an interference pattern in the illumination waveguide by the one or more light waves being propagated therein, wherein the interference pattern comprises at least one element of constructive interference for selectively illuminating a portion of the object, the at least one element having a dimension with a size in a range of 100 nm-10 µm, and wherein the controller is configured to sequentially change the interference pattern in relation to the object such that different portions are illuminated and the array of light-sensitive areas is configured to sequentially detect light from different portions of the object.

The imaging apparatus is configured to control forming of an interference pattern in the illumination waveguide, such that the interference pattern may be configured to select a portion of the object being imaged. The at least one element of the interference pattern may thus be arranged to control a resolution of the imaging. By sequentially changing the interference pattern in relation to the object, different portions of the object may be illuminated in sequence. Thus, the imaging apparatus may be able to combine image information acquired in relation to different interference patterns such that an image of the entire object may eventually be formed.

The use of a light wave propagating through total internal reflection in the illumination waveguide the object to be illuminated using an evanescent field of the propagated light wave outside the illumination waveguide. Since an intensity of the evanescent field quickly decreases with distance from the illumination waveguide, this implies that only objects or portions of objects arranged very close (in the order of 50-100 nm) to the illumination waveguide will be illuminated by the evanescent field. Hence, the use of the illumination waveguide sets a vertical resolution above the illumination waveguide.

Further, a shape of the at least one element of constructive interference controls a shape of an area at a surface of the illumination waveguide which is illuminated. This implies that a horizontal resolution parallel to the illumination waveguide may be set. The controlling of the interference pattern allows controlling the resolution of the imaging. Thus, the use of a controlled interference pattern may allow defining a super-resolution of imaging, i.e., resolution of imaging need not be limited to a free space diffraction limit. Rather, the controlled interference pattern may be formed within a material having a large refractive index and hence a resolution of the elements of the interference pattern may be higher than the free space diffraction limit. This implies that the smallest resolved details may be significantly smaller than a free space wavelength of light.

The refractive index of a material of the illumination waveguide may be larger than the refractive index of air (i.e., >1) and may be larger than a refractive index of material surrounding the illumination waveguide. This implies that total internal reflection may occur in the illumination waveguide, and may also ensure that a high resolution of imaging is enabled. In an embodiment, the refractive index of the material of the illumination waveguide may be much larger than the refractive index of air, such as >1.5, or even >1.8 to facilitate that small details of an object may be resolved by allowing for an interference pattern having elements with small dimensions to be formed.

For instance, the illumination waveguide may be formed from any one of the following materials: niobium oxide (NbO) having refractive index n=2.37, silicon nitride (SiN) having refractive index n=1.9, titanium oxide ($TiO_x$) having refractive index n=2.65 or gallium nitride (GaN) having refractive index n=2.4.

A dimension of the element may have a size as small as 100 nm so as to define a horizontal resolution of 100 nm, which for visible wavelengths is a much higher resolution than that which is possible to achieve with systems being limited by a free space diffraction limit. The smallest possible size of elements of the interference pattern will scale with the inverse of the waveguide refractive index.

However, it should be realized that it may still be beneficial to use the controlling of resolution via the elements of interference patterns for more coarse resolutions, such that a resolution of up to 10 µm may be relevant using the technology of controlling the interference pattern in the illumination waveguide.

The imaging apparatus may provide a fixed relation as to which areas in an object plane are imaged by the respective light-sensitive areas. This implies that a first light-sensitive area in the array is configured to receive light from a first part of the object. The interference pattern may be controlled to illuminate a portion of the first part of the object. Therefore, the light detected by a light-sensitive area may be attributed to a specific portion of the object as selected by the interference pattern. By sequentially changing the interference pattern, different portions of the object may be illuminated, so that an image with a high resolution defined by the dimension of elements of the interference pattern may be eventually reconstructed.

With the imaging apparatus according to the present disclosure, information allowing an object to be imaged with super-resolution may be acquired using a very compact set-up. Due to the array of light-sensitive areas being arranged on a common substrate with the illumination waveguide, both illumination of an object and detecting of light from the object may be provided in a very compact manner.

The compact set-up may allow for a point spread function on the array of light-sensitive areas based on a point illuminated by the illumination waveguide to be very small. This implies that a portion of an object illuminated by an element may be imaged using a small area of the array such that a plurality of elements may be formed in the interference pattern while allowing the light from portions of the object illuminated by different elements to be detected in separate light-sensitive areas in the array. Hence, the object may be imaged without need of an imaging lens between the object and the array of light-sensitive areas.

The compact set-up of the imaging apparatus facilitates mass-production of the imaging apparatus and also enables use of a relatively simple apparatus. The imaging apparatus need not comprise bulky optical components and precise alignment of optical components, which implies that the imaging apparatus may be both compact and affordable, so that high resolution imaging need not be restricted to specialized laboratories.

The sequential changing of the interference pattern may allow for all portions of an object to be illuminated and an entire field of view to be imaged by the sequential detections of light. A sequence of frames may be read out from the array of light-sensitive areas corresponding to image information of respective portions of the object, wherein the sequence of frames may then be combined for reconstructing an image of the object.

By forming an interference pattern having a plurality of elements, a large area of the object may be imaged using relatively few sequential steps of changing the interference pattern. However, it should be realized that the interference pattern may comprise only a single element, which may be moved for illuminating different portions of the object for imaging of the object.

The controlling of the interference pattern formed in the illumination waveguide allows a large field of view to be imaged. The controlling of the interference pattern may be achieved based on modulation of one or more light waves, such that the forming of the interference pattern does not require the waveguide to be narrow so as to limit a field of view.

The size of the at least one element may be selected such that an element illuminates a smaller portion of the object than what is imaged by a single light-sensitive area. In this respect, the element may select which portion of the object that is being imaged by the light-sensitive area so as to set a horizontal resolution of the imaging of the object.

The size of the element may thus be selected based on a desired resolution of the image. The size of the element is limited by an effective wavelength of light in the illumination waveguide, such that, for visible wavelengths, it may be difficult to generate an interference pattern having an element with a size smaller than 100 nm.

However, it should be realized that the size of the element may be selected based on a desired resolution. If a smaller size is selected, a longer sequence of frames may be needed for acquiring an image of the object. However, if a larger size is selected, the resolution will be decreased.

The size of the elements may thus be selected taking a desired resolution and a time for acquiring a sequence of frames into account. In this regard, the size of the elements may be selected to be within the range of 100 nm-10 µm.

In examples where a light-sensitive area comprises a plurality of wells for separate detection of light, e.g., for sequential light detection, the size of the elements may be matched to the size of the wells. For instance, the size of the elements may be equal to or smaller than the wells, such that light from an illuminated portion of the object will be detected in a single well of the light-sensitive area.

It should be realized that the "elements" of constructive interference of the interference pattern may have any shape. The elements may form spots, such as substantially circular or elliptical spots, such that a largest dimension of the spot (e.g., a diameter) may have a size in the range of 100 nm-10 µm. Alternatively, the elements may have more irregular shapes. Also, the elements may form lines or elongate shapes, which may have a large extension in a first direction. However, such elongate elements pray be smaller in a second direction, perpendicular to the first direction, so that the elements in the second direction has a dimension which is relatively small and in the range of 100 nm-10 µm. This implies that the element will, in the second direction, select a portion of the object being imaged.

The sequential interference patterns may be configured to partially overlap. Alternatively, each interference pattern in a sequence of changed interference pattern illuminates a distinct portion of the object. There may be a trade-off between ensuring that the entire field of view is illuminated and a total acquisition time for illuminating the entire field of view. A large overlap between sequential interference patterns may help ensure that no spots in the field of view are missed during an imaging sequence, while the large overlap may also require a long sequence of interference patterns to be used.

Light detected by a light-sensitive area in the array of light-sensitive areas may be individually read out. Thus, the light-sensitive areas in the array may be separate areas. Each light-sensitive area may be a continuous area for detecting light incident on the area.

The illumination waveguide may be arranged above the array of light-sensitive areas and the illumination waveguide and the array may be arranged in parallel and separate planes. This implies that the light propagating in the illumination waveguide may by total internal reflection be mainly confined to the illumination waveguide such that no or very low intensities of the light from the illumination waveguide may reach the array of light-sensitive areas in a separate plane.

The light illuminating the object may be scattered by the object so as to reach the array of light-sensitive areas. However, according to an alternative example, the light may induce fluorescence in the object, such that fluorescent light may be detected by the array of light-sensitive areas. Thus, the imaging apparatus may be configured to perform fluorescence microscopy, wherein positions of fluorophores in a high density array may be determined using the imaging apparatus.

According to an example embodiment, the illumination waveguide is monolithically integrated on the substrate on which the array of light-sensitive areas is formed.

This allows for a more accurate control of a relation between the array of light-sensitive areas and the illumination waveguide to be achieved. Also, the imaging apparatus may be formed using semiconductor manufacturing technology, which is suitable for mass production.

According to an example embodiment, the interference pattern comprises a plurality of elements, and the illumination waveguide is arranged in relation to the array of light-sensitive areas such that a first point spread function on the array of light-sensitive areas based on illumination by a first element in the plurality of elements does not overlap with a second point spread function on the array of light-sensitive areas based on illumination by a second element in the plurality of elements adjacent to the first element.

The arrangement of the array of light-sensitive areas close to the illumination waveguide may help ensure that a point spread function from an illuminated point may have a small size on the array of light-sensitive areas. For instance, the light from a point on the object may be received by a single light-sensitive area. The point spread functions based on illumination by adjacent elements in the interference pattern may be configured not to overlap on the array of light-sensitive areas, which facilitates attributing detected light to an illuminated spot of the object.

A size of the point spread function may be defined as a size of a spot where intensity of light is 50% of a maximum intensity, so called full width at half maximum (FWHM).

According to an example embodiment, the imaging apparatus further comprises a bottom cladding layer between the illumination waveguide and the array of light-sensitive areas for controlling total internal reflection of light propagating in the illumination waveguide.

The bottom cladding layer may ensure that total internal reflection occurs in the illumination waveguide, such that the one or more light waves properly propagate through the illumination waveguide.

The bottom cladding layer may be configured to have a thickness sufficient to help ensure that very low losses of light intensity occur through the bottom cladding layer. However, the bottom cladding layer may be thin enough to help ensure that there is a small distance between the array of light-sensitive areas and the object. This implies that a point spread function of the imaging apparatus may be limited and may thus allow forming an interference pattern having a small distance between adjacent elements, while allowing the detected light to be attributed to a portion of the object being illuminated by a specific element.

According to an example embodiment, the imaging apparatus further comprises a filter arranged above the array of light-sensitive areas for rejecting an excitation wavelength propagating through the illumination waveguide and passing a fluorescence wavelength of fluorescence induced by the object being illuminated.

The filter may help ensure that excitation light does not interfere with detection of fluorescence light. Thus, by having a filter, an improved signal-to-noise ratio of detected light may be obtained.

The filter may be integrated above the array of light-sensitive areas with the illumination waveguide integrated above the filter.

It should be realized that, in some example embodiments, the filter may not be necessary, as the excitation light is mainly propagating in the illumination waveguide and may therefore not reach the array of light-sensitive areas.

Also, it should be realized that, in some example embodiments, the imaging apparatus need not use fluorescence light. For instance, the illumination may induce scattering of light from the object, and the scattered light may be detected for imaging of the object. In such cases, a filter may not be useful for filtering out an excitation wavelength. However, a filter may anyway be used for helping prevent other stray light from reaching the array of light-sensitive areas.

According to an example embodiment, the imaging apparatus further comprises a top cladding layer above the illumination waveguide for controlling total internal reflection of light propagating in the illumination waveguide, wherein an opening is formed in the top cladding layer in relation to a measurement position for imaging the object.

The top cladding layer may help ensure that total internal reflection occurs in the illumination waveguide, such that the one or more light waves properly propagate through the illumination waveguide.

A measurement position may be defined in the top cladding layer, and the measurement position may be arranged to extend over an area corresponding to a total area from which the array of light-sensitive areas may detect light. A size or shape of the opening of the top cladding layer need not exactly correspond to the measurement position. Rather, the opening of the top cladding layer may, for instance, be larger than an area from which the array of light-sensitive areas detect light.

The top cladding layer may help ensure that light may be propagated to the measurement position, which implies that input of light to the illumination waveguide need not occur very close to the measurement position, which may reduce the amount of stray light that reaches the array of light-sensitive areas.

According to an example embodiment, a plurality of openings may be formed in the top cladding layer for defining a plurality of measurement positions. This may enable forming a plurality of measurement regions in the imaging apparatus, such that different samples may be provided in different measurement regions, and light from these regions may be simultaneously detected using the array of light-sensitive areas. The top cladding layer may help ensure that light is propagated through the illumination waveguide to each of the measurement regions. A measurement region may be associated with a plurality of light-sensitive areas in the array or may even be associated with a single light-sensitive area. Also, multiple measurement regions per light-sensitive area may be possible, wherein each of the multiple measurement regions is associated with a separate opening in the top cladding layer.

It should also be realized that a top cladding layer need not necessarily be provided. Total internal reflection may occur in the illumination waveguide in relation to an ambient environment of the apparatus, such as air.

According to an example embodiment, the imaging apparatus further comprises at least one input waveguide arranged on the common substrate, wherein the at least one input waveguide is configured to input a light wave into the illumination waveguide, and wherein the imaging apparatus further comprises at least one influencing device for tuning at least one of a phase or wavelength of light in an input waveguide.

Due to the imaging apparatus comprising at least one input waveguide on the common substrate, modulation of the interference pattern may be performed on the substrate. This implies that a fast operation speed may be provided for sequentially changing the interference pattern, since the modulation may be provided on-chip.

The influencing device may be configured to affect propagation of light through the input waveguide, which may be used for tuning at least one of a phase or wavelength of light. In addition, the influencing device may be configured to tune an intensity of light. For instance, the influencing device may affect a refractive index of the waveguide (or a material close to the waveguide), such as by thermal or opto-electromechanical modulation. The influencing device may alternatively change a length of the input waveguide, e.g., by the input waveguide being formed on a membrane which may be micro-electro-mechanically controlled.

By tuning a phase and/or wavelength of light in at least one input waveguide, the interference pattern formed by inputting the one or more light waves into the illumination waveguide may be controlled. Also, an intensity of light may be tuned in controlling the interference pattern. The at least one influencing device may thus be controlled in order to sequentially change the interference pattern.

If a single input waveguide is used, light may be input at a first end of the illumination waveguide and a mirror may be arranged at an opposite end of the illumination waveguide, such that a light wave input by the input waveguide may interact with light reflected by the mirror for forming the interference pattern. The interference pattern may thus be changed by tuning the phase and/or wavelength of light in the input waveguide and/or tuning a position of the mirror.

According to an example embodiment, the illumination waveguide is a planar waveguide having an extension for enabling the interference pattern to be formed in the waveguide over an area imaged by the array of light-sensitive areas.

This implies that a slab illumination waveguide may be used, which may have a large extension in two dimensions of the plane of the planar waveguide. By controlling the interference pattern in the planar waveguide, illumination for a large field of view may be provided.

According to an example embodiment, the interference pattern comprises a plurality of elements, wherein the elements of the interference pattern are spots, and the plurality of spots are arranged at vertices of equilateral triangles.

Arrangement of spots at vertices of equilateral triangles may allow the spots to be arranged in a close relationship while a light-sensitive area in the array is arranged to only receive light from the object induced by a single spot. By having a close relationship between the spots, the entire field of view may be covered using a short sequence of interference patterns. Thus, an entire field of view may be quickly illuminated.

According to an example embodiment, the controller is configured to sequentially change the interference pattern in relation to the object for scanning the at least one element of the interference pattern in relation to the object.

This implies that the interference pattern may be changed to move an element over the part of the object being imaged by a light-sensitive area. The entire part of the object may thus be illuminated in an organized manner.

The scanning of the elements may be performed in two directions in order to ensure that an entire two-dimensional field of view is illuminated.

It should be realized that the interference pattern may be sequentially changed in other manners for illuminating an entire field of view. For instance, the interference pattern may comprise elements, such as lines, having a large extension in a first direction, such as corresponding to an extension of an entire row or column of the array of light-sensitive areas. The interference pattern may be changed in order to change an angle of the lines in relation to a two-dimensional area of a measurement position. By providing a number of different angles of the elements of the interference pattern, an entire field of view may be illuminated.

Also, in another example embodiment, the interference pattern may be randomly changed between two consecutive interference patterns in the sequence. By having a sufficiently long sequence of interference patterns, the entire field of view may be illuminated. This implies that each interference pattern may have a random pattern, which may be handled with an image reconstruction based on an unknown pattern of illuminating the object.

According to yet another example embodiment, a set of interference patterns may be determined and used in a sequence of illuminating the object. The object may be sequentially illuminated by the interference patterns in the set, wherein an order of the interference patterns being used for illumination may be freely chosen or even provided in a random order.

According to an example embodiment, the imaging apparatus comprises one or more illumination waveguides which are configured to propagate two or more light waves of a first wavelength and a second wavelength by total internal reflection, wherein the controller is configured to control forming of a first interference pattern for the first wavelength and a second interference pattern for the second wavelength, wherein the first wavelength is different from the second wavelength.

This implies that the object may be illuminated with two or more different wavelengths for imaging of the object based on the plurality of wavelengths. It should be realized that the imaging apparatus may be set up so as to form the first and second (or more) interference patterns within the same illumination waveguide or within different illumination waveguides arranged on the same substrate.

The light waves of the first and second wavelengths may be supplied simultaneously or sequentially to the illumination waveguide. This implies that the imaging based on the plural wavelengths may be performed simultaneously for the plurality of wavelengths and/or sequentially.

Further, the first and the second interference patterns may be equal, such that the same portions of the object may be illuminated by the two wavelengths. This may be achieved by the interference patterns of the two (or more) different wavelengths being provided in sequence, so as to not cause interference in detection of light based on the different wavelengths. Alternatively, the array of light-sensitive areas may be provided with different filters on different light-sensitive areas, such that the light of different wavelengths may be distinguished even if overlapping interference patterns of two different wavelengths are provided in the illumination waveguide.

A first portion of the object may be illuminated by the first interference pattern of the first wavelength. Then, the same first portion of the object may be illuminated by the second interference pattern of the second wavelength. This may be followed by the controller changing the interference pattern such that a second portion of the object is illuminated by the first interference pattern followed by the second portion of the object being illuminated by the second interference pattern. In this way, the object may be alternately illuminated by the first and the second wavelengths. It should be realized that the object may alternatively be illuminated by the first wavelength by sequentially changing the first interference pattern so as to illuminate the entire object by the first wavelength followed by the object being illuminated by the second wavelength by sequentially changing the second wavelength so as to illuminate the entire object by the second wavelength.

The first and second interference patterns may form different patterns, which are used for simultaneously illuminating different portions of the object. The controller may then be configured to sequentially change the first and the second interference patterns such that different portions of the object are illuminated by the first and the second interference patterns, respectively.

According to an example embodiment, the controller is configured to synchronize change of the interference pattern with a frame rate of the array of light-sensitive areas.

This implies that e interference pattern may be changed according to desire between subsequent frames in a sequence of acquired frames. Each frame acquired by the array of light-sensitive areas may be associated with a single interference pattern in the sequence.

The interference pattern may be changed in discrete steps, wherein the change of interference pattern may be controlled during read-out of a frame, such that when detection of a frame is initiated by the array, the interference pattern is stably formed in the illumination waveguide.

Hence, the information in each frame may be processed in correspondence with the interference pattern used when acquiring the frame.

Alternatively, the interference pattern may be continuously changed with a rate of change synchronized with the frame rate such that an element of the interference pattern has been moved a desired distance between subsequent frames in a sequence of acquired frames.

According to an example embodiment, the imaging apparatus further comprises a processing unit, which is configured to receive a sequence of frames from the array of light-sensitive areas and to reconstruct an image of the object based on the sequence of frames with a resolution based on the size of the at least one element.

This implies that the imaging apparatus may be able to also reconstruct the image such that the imaging apparatus may be able to output a high resolution image of the object. Hence, the imaging apparatus may not only detect information based on received light but may also form a reconstructed image based on an acquired sequence of frames.

However, it should be realized that in an alternative example embodiment, the imaging apparatus may output the information of the acquired frames to an external unit, which may perform reconstruction of the image.

According to an example embodiment, the array of light-sensitive areas is arranged on the substrate such that the array of light-sensitive areas is configured to receive light from the object through back-side illumination.

Using back-side illumination, control circuitry associated with the array of light-sensitive areas, such as circuitry for read-out of frames, need not be arranged between the array of light-sensitive areas and the illumination waveguide. Hence, using back-side illumination, a distance between the array of light-sensitive areas and the illumination waveguide may be very small.

This implies that a point spread function of the imaging apparatus may be limited, which may allow an interference pattern to be formed having a small distance between adjacent elements, while allowing the detected light to be attributed to a portion of the object being illuminated by a specific element.

According to a second aspect, there is provided a system for nucleic acid sequencing, comprising the imaging apparatus according to the first aspect.

Effects and features of this second aspect are largely analogous to those described above in connection with the first aspect. Example embodiments mentioned in relation to the first aspect are largely compatible with the second aspect.

The imaging apparatus may be incorporated in a system for nucleic acid sequencing. Due to a high resolution of the imaging apparatus, as provided by the control of the interference pattern, the imaging apparatus may be used for sequencing of a very dense pattern of nucleic acids. The system may, for instance, be used for detecting fluorescent light from the object, so as to detect labeled nucleic acids.

According to a third aspect, there is provided a method for imaging of an object, the method comprising: (1) transporting one or more light waves by total internal reflection through an illumination waveguide for illuminating an object in close relation to the illumination waveguide by an evanescent field of the one or more light waves, wherein the one or more light waves form an interference pattern in the illumination waveguide, the interference pattern comprising at least one element of constructive interference for selectively illuminating a portion of the object to define a resolution of imaging, the at least one element having a dimension with a size in a range of 100 nm-10 μm; (ii) receiving light from the object by an array of light-sensitive areas, wherein the array of light-sensitive areas is arranged on a common substrate with the illumination waveguide such that the array of light-sensitive areas is configured to receive light from a first portion of the object; and (iii) changing the interference pattern in relation to the object such that different portions of the object are illuminated, and the array of light-sensitive areas detects light from different portions of the object.

Effects and features of this third aspect are largely analogous to those described above in connection with the first and second aspects. Example embodiments mentioned in relation to the first and second aspects are largely compatible with the third aspect.

Due to the method, information allowing an object to be imaged with super-resolution may be acquired using a very compact set-up. Due to the array of light-sensitive areas being arranged on a common substrate with the illumination waveguide, both illumination of an object and detecting of light from the object may be provided in a very compact manner.

The interference pattern may define a resolution of an origin of light being detected by the array of light-sensitive areas. Due to the changing of the interference pattern, different portions may be illuminated so that light from all portions of an object may be detected with high resolution in a sequence of changing of the interference pattern.

The method may further comprise acquiring a sequence of frames by the array of light-sensitive areas, each frame being acquired based on a distinct arrangement of the interference pattern in relation to the object, and reconstructing an image of the object based on the sequence of frames.

A frame may acquire information associated with specific portions of an object, as selected by the interference pattern. Thus, by acquiring a sequence of frames with different interference patterns, an image of the object may be reconstructed.

DETAILED DESCRIPTION

Figure 1:
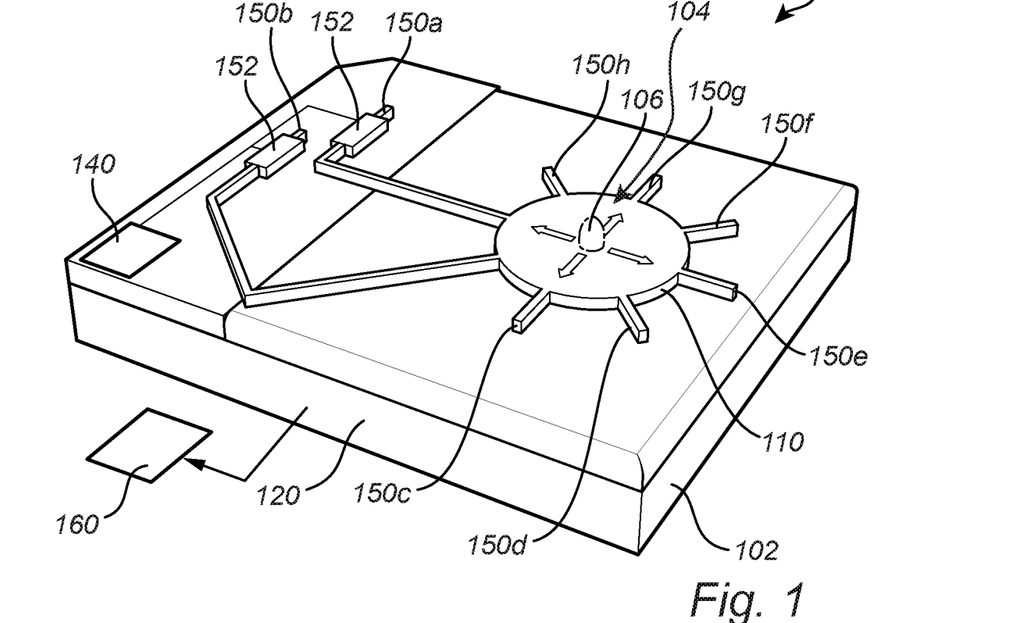
FIG. 1 is a perspective view of an imaging apparatus, according to an example embodiment.
Figure 2:
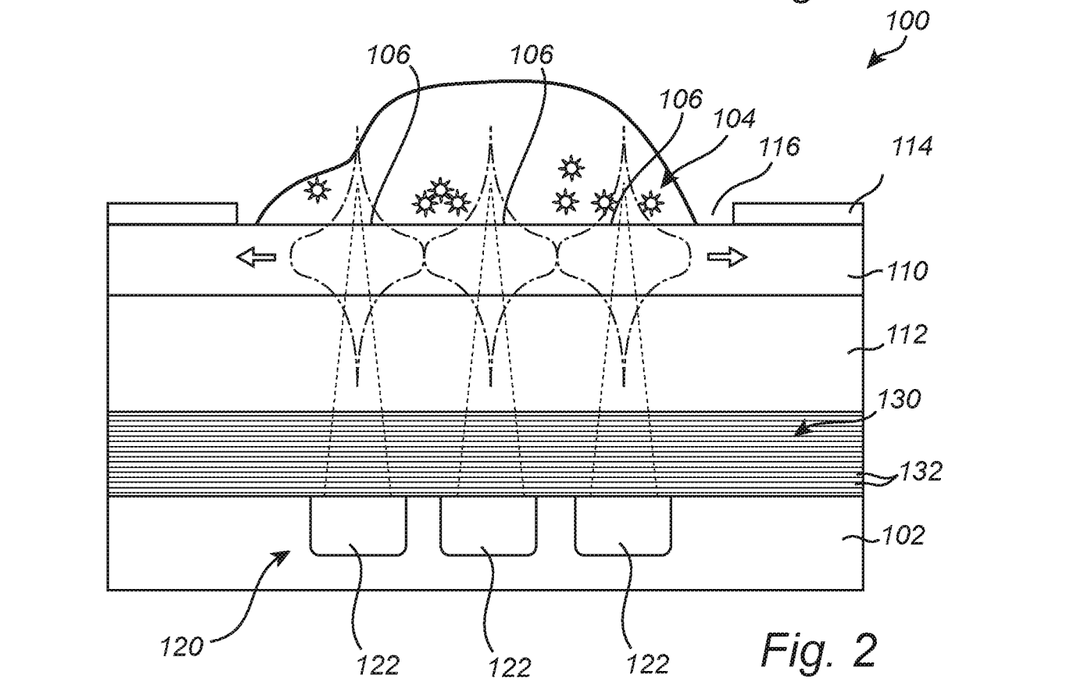
FIG. 2 is a cross-sectional view of the imaging apparatus, according to an example embodiment.

Referring to FIGS. 1-2, an imaging apparatus 100 will be described. The imaging apparatus is configured to illuminate an object and detect light from the object. In FIG. 1, a perspective view of the imaging apparatus 100 is shown, whereas in FIG. 2 a cross-sectional view of the imaging apparatus 100 is shown.

The imaging apparatus 100 comprises an illumination waveguide 110, which is configured to propagate one or more light waves by total internal reflection of light within the illumination waveguide 110. The illumination waveguide 110 may thus in relation to both a top surface and a bottom surface be surrounded by a substance such that total internal reflection in the illumination waveguide 110 is facilitated in an interface between the illumination waveguide 110 and a surrounding substance. This implies that the illumination waveguide 110 may be formed from a material having a larger refractive index than surrounding substance.

The total internal reflection of light implies that there is an evanescent field of light outside the illumination waveguide 110 at a point of reflection. The evanescent field is based on a small portion of light escaping a surface in which total internal reflection occurs and intensity of the light will very quickly decrease with distance from the surface. This evanescent field may interact with an object arranged close to a surface of the illumination waveguide 110 and may thus be used for illuminating an object by selectively illuminating only portions of the object very close to the surface (in the order of 50-100 nm).

The use of the evanescent field from total internal reflection in the illumination waveguide 110 may thus control a vertical resolution of an object being imaged, since only parts of the object very close to the surface of the illumination waveguide 110 will be illuminated.

The illumination waveguide 110 may be formed from SiN, which is suitable for transporting visible light, being essentially transparent to visible light, and is also suitable for monolithic integration on a semiconductor circuitry, since a layer of SiN may be formed without affecting an underlying semiconductor circuitry. Also, SiN has a refractive index facilitating total internal reflection in the illumination waveguide 110. However, it should be realized that other materials may alternatively be used in the illumination waveguide 110, as will be realized by a person skilled in the art.

As best shown in FIG. 2, the illumination waveguide 110 may be arranged above a bottom cladding layer 112, which may be formed from a material having a relatively low refractive index so as to ensure that light propagating through the illumination waveguide 110 is subject to total internal reflection in an interface between the illumination waveguide 110 and the bottom cladding layer 112.

Similarly, the illumination waveguide 110 may be arranged below a top cladding layer 114, which may also be formed from a material having a relatively low refractive index so as to ensure that light propagating through the illumination waveguide 110 is subject to total internal reflection in an interface between the illumination waveguide 110 and the top cladding layer 114. The bottom cladding layer 112 and the top cladding layer 114 may be formed from the same material.

The top cladding layer 114 may be provided with one or more openings 116 above the illumination waveguide 110. This implies that an object may be arranged in contact with the illumination waveguide 110 at the opening 116 in the top cladding layer 114. For instance, the imaging apparatus 100 may be provided with fluidic channel(s) for allowing a sample to be arranged in contact with the illumination waveguide 110. Alternatively, the opening 116 may provide an open space into which an object or sample may be placed in contact with the illumination waveguide 110.

The opening 116 in the top cladding layer 114 may be larger than an area of the illumination waveguide 110 which is used for imaging of the object. This implies that any diffraction or other influence on light propagating through the illumination waveguide 110 at an edge of the top cladding layer 114 facing the opening 116 may be diminished before light reaches a portion of the object to be imaged.

The imaging apparatus 100 is configured to form an interference pattern 104 in the illumination waveguide 110. Thus, an interference pattern 104 comprising at least one element 106 of constructive interference may be formed at a top surface of the illumination waveguide 110 facing the object. This implies that the at least one element 106 may provide a selective illumination of the object, such that the at least one element 106 selects portion(s) of the object being illuminated. Thus, a structured illumination pattern is formed in the illumination waveguide 110, which may be used for defining a resolution of imaging of the object.

The illumination waveguide 110 may extend in a two-dimensional plane such that a surface which has a large extension in two dimensions may be used for illuminating the object. This implies that an object may be illuminated in two dimensions using the interference pattern 104 for selecting which portion(s) of the object are illuminated at a certain point of time. The illumination waveguide 110 may extend over a size of several mm$^2$ so as to enable imaging of a relatively large field of view.

The imaging apparatus 100 may further comprise an array 120 of light-sensitive areas 122, wherein the light-sensitive areas 122 are configured to detect light from the illuminated object.

Each light-sensitive area 122 may be configured to generate a response, such as an electric charge, in proportion to light incident on the light-sensitive area 122. Thus, the light-sensitive area 122 may generate a measurement of intensity of light being emitted by a portion of the object. Due to the interference pattern 104 used for illuminating the object, the light detected by the light-sensitive area 122 may be associated with a portion of the object being illuminated. Thus, a size of the element 106 of constructive interference of the interference pattern 104 may define a resolution of imaging by the array 120 of light-sensitive areas 122.

The array 120 of light-sensitive areas 122 may, for example, be implemented as a charge-coupled device (CCD) or a complementary metal-oxide-semiconductor (CMOS) image sensor. Analog output from the light-sensitive areas 122 may pass through an analog-to-digital converter, such that the array 120 of light-sensitive areas 122 may output a digital representation of detected light. The digital representation is then suited to be transferred to other entities for processing the detected light and/or being processed within the imaging apparatus 100.

The array 120 of light-sensitive areas 122 may be arranged on a common substrate 102 with the illumination waveguide 110. This implies that the array 120 of light-sensitive areas 122 may be arranged close to the illumination waveguide 110 and, hence, also close to the object.

Light from a point on the object may reach an area on the array 120 of light-sensitive areas 122 as defined by a point spread function. Thus, the point spread function of the imaging apparatus 100 defines a size of an area on the array 120 of light-sensitive areas 122 that will receive light based on the illumination of the object by an element 106 in the interference pattern 104. Hence, if the point spread function is small, elements 106 in the interference pattern 104 may be arranged at a close distance to each other while allowing detection of light in the array 120 of light-sensitive areas 122 to be attributed to a single element 106 of the interference pattern 104.

The imaging apparatus 100 may be designed such that the point spread function is small based on ensuring that the array 120 of light-sensitive areas 122 is arranged close to the object.

The light from the object may be arranged to pass through the illumination waveguide 110, and the bottom cladding 112 before reaching the array 120 of light-sensitive areas 122. This implies that the illumination waveguide 110 and the bottom cladding layer 112 may be arranged to be relatively thin.

The illumination waveguide 110 may be designed with a thickness of 1-2 μm. This implies that the illumination waveguide 110 may be thin, while enabling proper control of an interference pattern 104 being formed in the illumination waveguide 110.

The bottom cladding layer 112 may be designed with a thickness of approximately 2 μm. This implies that the bottom cladding layer 112 is sufficiently thick to avoid stray light from the illumination waveguide 110 reaching the array 120 of light-sensitive areas 122 and affecting imaging of the object. Using a material having a high refractive index in the illumination waveguide 110, an extension of the evanescent field outside the illumination waveguide 110 may be limited. This implies that choosing a material for the illumination waveguide 110 having a higher refractive index, the bottom cladding layer 112 may be made thinner.

It should be realized that the thickness of the illumination waveguide 110 and the bottom cladding layer 112 may be thicker. However, in such cases, an interference pattern 104 comprising a plurality of elements 106 may be controlled to have a larger distance between adjacent elements 106 so that light from adjacent portions of the object (illuminated by adjacent elements) may be separately detected by the array 120 of light-sensitive areas 122.

The illumination waveguide 110 may be monolithically integrated on the substrate 102 on which the array 120 of light-sensitive areas 122 is formed. This implies that the illumination waveguide 110 may be arranged in a close relationship with the array 120 of light-sensitive areas 122. However, it should be realized that the illumination waveguide 110 may be arranged on a common substrate 102 with the array 120 of light-sensitive areas 122 in another manner. For instance, the array 120 of light-sensitive areas 122 and the illumination waveguide 110 with bottom cladding layer 112 and top cladding layer 114 may be separately manufactured in two separate physical units, which may then be attached to each other in any manner, such as by gluing.

The array 120 of light-sensitive areas 122 may be connected to circuitry, e.g., read-out circuitry for reading out information of detected intensities of light from the array 120 of light-sensitive areas 122. The circuitry may be arranged, at least partly, in a plane parallel to the array 120 of light-sensitive areas 122.

The array 120 of light-sensitive areas 122 may be configured for back-side illumination, i.e., light reaches the array 120 from an opposite side to a side on which the circuitry connected to the array 120 is arranged. This implies that the light from the object need not pass the circuitry and, hence, the object may be closer to the array 120 of light-sensitive areas 122, facilitating a small point spread function.

However, it should be realized that the imaging apparatus 100 may alternatively be configured for front-side illumination of the array 120 of light-sensitive areas 122.

The imaging apparatus 100 may further comprise a filter 130 between the array 120 of light-sensitive areas 122 and the bottom cladding layer 112. The filter 130 may be configured to selectively transmit a wavelength or band of wavelengths of interest. This may be useful when the imaging apparatus 100 is used for detecting fluorescence light from the object. The filter 130 may thus be configured to transmit fluorescence light and reject excitation light, such that the excitation light does not reach the array 120 of light-sensitive areas 122.

The filter 130 may be formed from a material so as to selectively absorb or reflect light of undesired wavelengths, whereas light of interest from the object are passed by the filter 130.

However, the filter 130 may alternatively be formed by a plurality of layers 132, as illustrated in FIG. 2. The plurality of layers 132 may have appropriate thicknesses, such that light reflected back and forth through a layer will form constructive or destructive interference depending on the wavelength of light. Thus, the filter 130 may be arranged to selectively transmit light depending on wavelength. In an embodiment, the filter 130 may be formed as a Fabry-Perot interference filter.

The filter 130 may be monolithically integrated on the array 120 of light-sensitive areas 122.

The imaging apparatus 100 may further comprise a controller 140 for controlling the interference pattern 104 formed in the illumination waveguide 110. The controller 140 may be configured to change the interference pattern 104.

The controller 140 may be configured to provide control signals in order to affect a light wave being input to the illumination waveguide 110 for controlling the interference pattern 104 in the illumination waveguide 110.

The controller 140 may send the control signal to an external light source, so as to control the light emitted by the external light source. Light from the external light source may then be coupled to an input waveguide 150 and further coupled from the input waveguide 150 into the illumination waveguide 110.

The controller 140 may alternatively or additionally send the control signal to an influencing device 152, which may be configured to act on the input waveguide 150 so as to affect propagation of light in the input waveguide 150.

The imaging apparatus 100 may comprise a light source, which may be arranged externally to the common substrate 102. The common substrate 102 may comprise a light coupler for coupling light from the external light source to the input waveguide 150. The imaging apparatus 100 may comprise a housing in which the light source is mounted in a controlled relationship to the common substrate 102 for controlling propagation of light in the input waveguide 150. However, in an alternative example, the imaging apparatus 100 may comprise one or more light couplers for coupling light from external light source(s) to the input waveguide(s) 150, whereby a set-up including the external light sources may be established by an end user.

According to another example embodiment, the imaging apparatus 100 may comprise one or more light sources, which may be arranged on the common substrate 102.

The light source may provide coherent light. For instance, the light source may be a laser light source. Where the light source is arranged on the common substrate 102, the light source may be a laser diode, such as a vertical-cavity surface-emitting laser.

The controller 140 may be configured to tune at least one of a phase or wavelength of light in the input waveguide 150 for affecting light input into the illumination waveguide 110 and the interference pattern formed therein. Also, an intensity of light in the input waveguide 150 may be affected.

The imaging apparatus 100 may comprise a plurality of input waveguides Having a large number of input waveguides 150a-h may allow for more accurate control of the interference pattern to be formed in the illumination waveguide 110. However, a large number of input waveguides 150a-h may also result in a more complex arrangement of input waveguides 150a-h and input of light to input waveguides 150a-h, which may increase complexity of a structure of the imaging apparatus 100. Therefore, the number of input waveguides 150a-h may be chosen based on a balance of controlling the interference pattern 104 and a cost (complexity) of the imaging apparatus 100.

Light coupled into the illumination waveguide 110 will interact in the illumination waveguide 110 to form an interference pattern 104 therein. The interference pattern 104 formed will be dependent on the light waves input into the illumination waveguide 110 and the relation between these light waves. If a single input waveguide 150 is used, light may enter the illumination waveguide 110 at a first end and may be reflected by a mirror at an opposite end of the illumination waveguide 110 such that an interference between light from the input waveguide 150 and reflected light may form an interference pattern. It should also be realized that an imaging apparatus comprising a plurality of input waveguides 150a-h may further comprise one or more mirrors for reflecting light into the illumination waveguide 110.

The interference pattern in the illumination waveguide 110 may thus be controlled by affecting a light wave in at least one of the input waveguides 150 and/or affecting reflection of light by at least one mirror. This implies that a relation between light waves propagating in the illumination waveguide 110 is changed such that the interference pattern 104 in the illumination waveguide 110 will also change.

The input waveguide 150 and the influencing device 152 may be arranged on the common substrate 102 so that the interference pattern 104 may be controlled by means of components arranged on the common substrate 102 facilitating a compact imaging apparatus 100.

To obtain a desired illumination field pattern, one or more of the phase, wavelength, and intensity of light in the input waveguides can be calculated using holographic tweezer techniques which are adopted for two-dimensional waveguides.

Holographic tweezer techniques often use the Fourier transform (FT-)based Gerchberg-Saxton (GS) algorithm, an iterative search procedure for obtaining a hologram phase that can yield the desired intensity distribution. Another approach can be to consider the system as a waveguide phased array analog.

Tuning of a phase, intensity, or wavelength of light in the input waveguide 150 may be achieved in a number of different manners as controlled by the influencing device 152. Thus, the influencing device 152 may control a characteristic which affects propagation of light in the input waveguide 150.

For instance, the influencing device 152 may provide a thermal modulation of the light wave in the input waveguide 150. Thus, by heating of a local environment in which the input waveguide 150 is arranged, a phase, intensity, or wavelength of light in the input waveguide 150 may be tuned. The heating of the local environment may, for instance, be used for changing a length of the input waveguide 150.

Alternatively, the influencing device 152 may affect propagation of light in the input waveguide 150 through an opto-electro-mechanical effect. For instance, the input waveguide 150 may be at least partly arranged on a membrane, which may be configured to flex in dependence of an electrical signal, e.g., affecting a support of the membrane. A length of the input waveguide 150 may thus be changed due to a change of shape of the membrane. According to another example embodiment, a membrane may be arranged in close relation to the input waveguide 150 and may be configured to be selectively pulled towards the input waveguide 150, e.g., by electrostatically pulling the membrane, such that an effective refractive index of the input waveguide 150 may be changed in dependence of a relation between the membrane and the input waveguide 150.

According to yet another alternative example embodiment, the influencing device 152 may affect propagation of light in the input waveguide 150 by applying an electric or magnetic field to the input waveguide 150. Hence, the influencing device 152 may be configured to provide an electric or magnetic field in a local environment in which the input waveguide 150 is arranged. Then, a refractive index of the input waveguide 150 may be changed in dependence of the applied electric or magnetic field.

It should be realized that the influencing device 152 may be configured to affect propagation of light in the input waveguide 150 in other manners, as known to a person skilled in the art. Also, the influencing device 152 may comprise a plurality of parts which may provide a combined effect on the propagation of light in the input waveguide 150.

The controller 140 may be configured to synchronize changing of the interference pattern 104 with a frame rate of the array 120 of light-sensitive areas 122. The controller 140 may thus ensure that each frame is acquired by the array 120 of light-sensitive areas 122 in relation to a desired interference pattern 104.

The controller 140 may be configured to continuously change the interference pattern 104 such that elements 106 of the interference pattern 104 may slowly move while the frames are acquired. Alternatively, the controller 140 may be configured to change the interference pattern 104 in steps, such that h elements) 106 of the interference pattern 104 are moved in discrete steps between subsequent frames.

Figure 3:
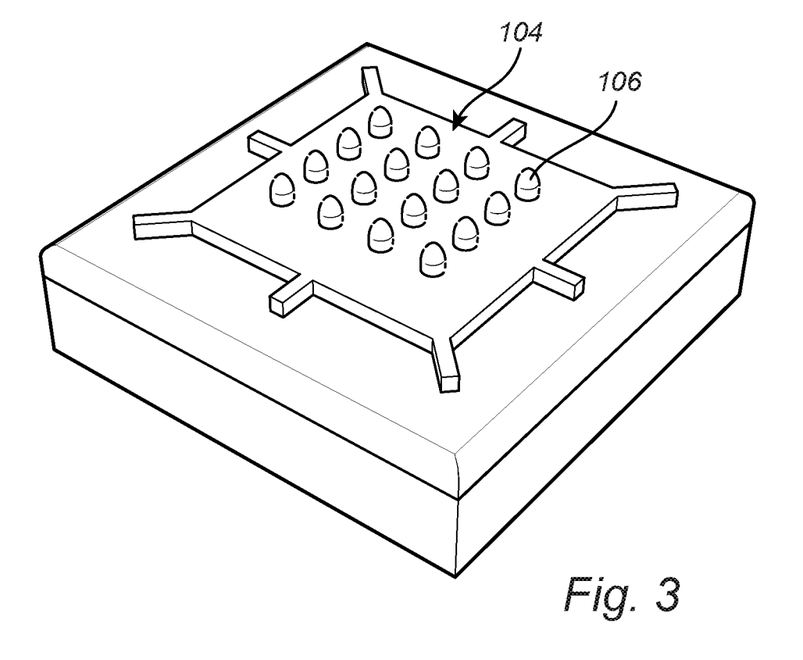
FIG. 3 is a schematic view illustrating an interference pattern formed in the imaging apparatus, according to an example embodiment.

The interference pattern 104 may comprise at least one element 106 of constructive interference for selective illumination of at least one portion of the object. The changing of the interference pattern 104 may move the at least one element 106 in relation to the object such that the element 106 is scanned over the object for imaging the entire object.

The at least one element 106 may provide a selective illumination of the object in two dimensions. The at least one element 106 may thus have an extension two dimensions, and the smallest extension in these two dimensions may have a size in the range of 100 nm-10 μm. This implies that the at least one element 106 may selectively illuminate a portion of the object of a corresponding size providing a resolution of imaging of the object.

The at least one element 106 may have a shape of a circular or elliptical spot. This implies that the element 106 may select a portion of the object in two dimensions such that a resolution in two dimensions may be provided by means of the at least one element 106. However, it should be realized that the at least one element 106 may alternatively have a shape of a line, such that a selective illumination of the object is provided only in one dimension.

The changing of the interference pattern 104 may be configured to scan the one or more spots of the interference pattern over the object. A throughput of the imaging apparatus 100 may then be defined by a scanning speed and a number of elements 106 in the interference pattern 104. However, the throughput may further be limited by an integration time for acquiring frames using the array 120 of light-sensitive areas 122, which integration time may be longer than an available speed of scanning the interference pattern 104.

As illustrated in FIG. 3, the interference pattern 104 may be formed as a regular pattern of a plurality of spots 106.

The interference pattern 104 may comprise a periodic pattern of elements 106, and the periodic pattern may be moved over the object for imaging of the entire field of view. In an example embodiment, the periodic pattern may be a periodic lattice of equilateral triangles, which may allow adjacent elements 106 to be close to each other while avoiding cross-talk between light from different elements 106. Thus, a number of translations required to cover the field of view may be reduced.

In some examples, rather than scanning the interference pattern 104, the interference pattern 104 may be changed between a number of set-ups which together cover the field of view. For instance, if an interference pattern 104 is formed with a plurality of lines, an angle and/or translational position of the lines may be changed between subsequent interference pattern. Using a number of different angles and positions of the lines, the entire field of view may be imaged.

As mentioned above, the controller 140 may provide control signals so as to control the interference pattern 104 formed in the illumination waveguide 110. The controller 140 may be pre-programmed to provide a sequence of control signals so as to form a sequence of interference patterns 104 in the illumination waveguide 110. Alternatively, the controller 140 may be configured to calculate a relation between light waves input to the illumination waveguide 110 for forming a desired interference pattern 104 and then apply corresponding control signals for controlling forming of the desired interference pattern 104.

The controller 140 may be configured to control influencing devices 152 for controlling the interference pattern 104 in the illumination waveguide 110 and may also be configured to control acquiring of frames by the array 120 of light-sensitive areas 122. Alternatively, the acquiring of frames by the array 120 of light-sensitive areas 122 may be separately controlled.

The controller 140 may be implemented in hardware or as any combination of software and hardware. For instance, the controller 140 may comprise a central processing unit (CPU) comprising software for providing functionality of the controller 140 in a general-purpose processor. Alternatively, the controller 140 may be implemented as firmware arranged in an embedded system on the common substrate 102. As a further alternative, the controller 140 may be implemented as a special-purpose circuitry for providing specific logical operations. Thus, the controller 140 may be provided in the form of an application-specific integrated circuit (ASIC), an application-specific instruction-set processor (ASIP) or a field-programmable gate array (FPGA).

The array 120 of light-sensitive areas 122 is configured to acquire a plurality of sequential frames corresponding to different arrangements of the interference pattern 104 in relation to the object. The sequence of frames may be used for reconstructing an image of the object.

Each frame may be received by an image reconstruction unit 160. The image reconstruction unit 160 may comprise information of a point-spread function of the imaging apparatus 100. Using the point spread function, the image reconstruction unit 160 may perform digital deconvolution for forming a reconstructed partial image based on the intensity of light detected in a frame. The reconstructed partial image may provide information of the portion(s) of the object illuminated during acquiring of the frame. The image reconstruction unit 160 may further combine a plurality of reconstructed partial images for forming of a complete image of the object.

The point spread function of the imaging apparatus 100 may be measured in a calibration performed after the imaging apparatus 100 has been manufactured and before the imaging apparatus 100 is shipped to a customer. The point spread function may thus be stored in the image reconstruction unit 160. When the imaging apparatus 100 is formed without any lens between the object and the array 120 of light-sensitive areas 122, the image reconstruction unit 160 may use a common point spread function for deconvolving the entire field of view.

To deal with noise, errors, and/or instabilities of the phase of the input waveguides, different approaches in reconstruction of the image can be considered. Blind structured illumination microscopy (SIM) and filtered blind-SIM are reconstruction algorithms that are able to process SIM data even if the illuminations are strongly distorted. Blind-SIM and filtered blind-SIM approaches reconstruct simultaneously sample and excitation patterns without a priori information on the latter. Pattern-estimation (PE) SIM, which is disclosed in Yeh L.-H., Tian, L. & Waller, L., "Structured illumination microscopy with unknown patterns and a statistical prior," Biomedical Optics Express, vol. 8, pages 695-711 (2017), is an algorithmic self-calibration strategy for SIM that does not need to know the exact illumination patterns a priori.

Various algorithms have been proposed for single pixel imaging (SPI) reconstruction, including linear correlation methods, the alternating projection (AP) method, and compressive sensing (CS) based methods.

The image reconstruction unit 160 may be implemented in hardware or as any combination of software and hardware. For instance, the image reconstruction unit 160 may be implemented in a common CPU with the controller 140 or in a separate CPU, wherein the CPU comprises software for providing functionality of the image reconstruction unit 160 in a general-purpose processor. Alternatively, the image reconstruction unit 160 may be implemented as firmware arranged in an embedded system on the common substrate 102. As a further alternative, the image reconstruction unit 160 may be implemented as a special-purpose circuitry for providing specific logical operations. Thus, the image reconstruction unit 160 may be provided in the form of an application-specific integrated circuit (ASIC), an application-specific instruction-set processor (ASIP) or a field-programmable gate array (FPGA).

The imaging apparatus 100 may be used for detecting fluorescent light from the object. The imaging apparatus 100 may thus be used for DNA sequencing of a biological sample. Due to a high resolution of the imaging apparatus 100, as provided by the control of the interference pattern, the imaging apparatus 100 may be used for DNA sequencing of a very dense pattern of DNA.

The imaging apparatus 100 could be used for various other applications as will be realized by a person skilled in the art. For instance, instead of detecting fluorescent light from the object, the imaging apparatus 100 may be configured to detect light scattered by the object.

Figure 4:
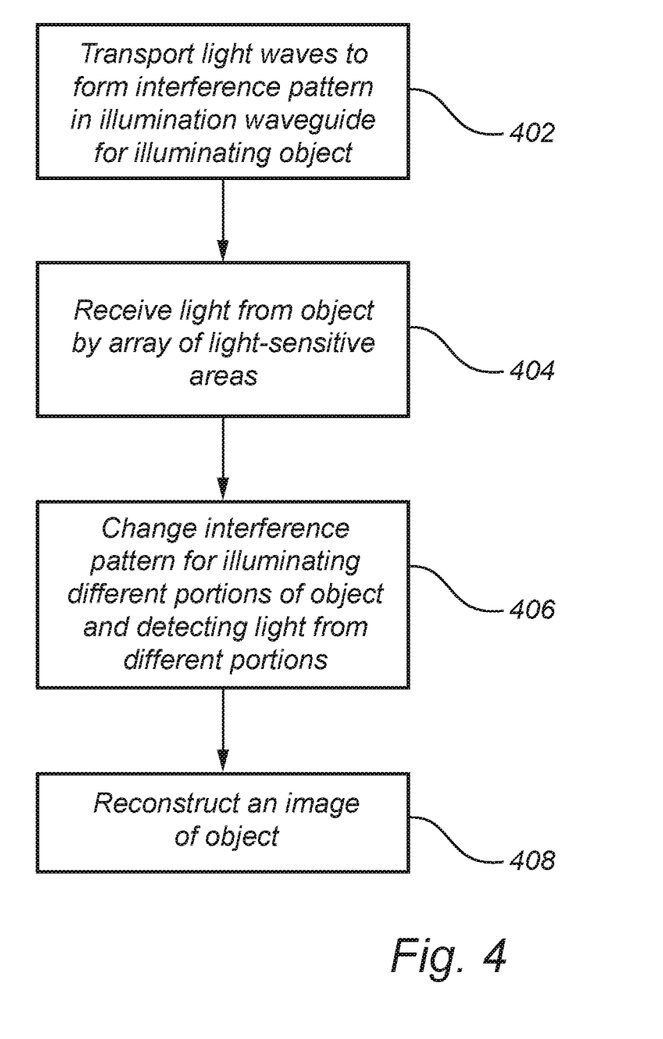
FIG. 4 is a flow chart of a method, according to an example embodiment.

Referring now to FIG. 4, a method for imaging of an object will be described.

The method comprises transporting 402 one or more light waves by total internal reflection through the illumination waveguide 110 for illuminating an object n close relation to the illumination waveguide 110 by an evanescent field of the one or more light waves. The light waves are controlled to form an interference pattern 104 in the illumination waveguide 110 for selectively illuminating a portion of the object.

The method further comprises receiving 404 light from the object by the array 120 of light-sensitive areas 122.

Further, the method comprises changing 406 the interference pattern 104 in relation the object such that different portions of the object are illuminated and the array 120 of light-sensitive areas 122 detects light from different portions of the object.

Thus, a sequence of frames may be acquired by the array 120 of light-sensitive areas 122, wherein the interference pattern 104 has a distinct arrangement in relation to the object in each frame. The method may further comprise reconstructing 408 an image of the object based on the acquired sequence of frames.

The present disclosure has mainly been described with reference to a limited number of examples. However, as is readily appreciated by a person skilled in the art, other examples than the ones disclosed above are equally possible within the scope of the disclosure, as defined by the appended claims.

What is claimed is:

1. An imaging apparatus comprising:
an illumination waveguide configured to propagate one or more light waves by total internal reflection, wherein an evanescent field of the propagated light wave is configured to illuminate an object in close relation to the illumination waveguide;
an array of light-sensitive areas configured to detect light from the object, wherein the array of light-sensitive areas is arranged on a common substrate with the illumination waveguide; and
a controller configured to control forming of an interference pattern in the illumination waveguide by the one or more light waves being propagated therein, wherein the interference pattern comprises at least one element of constructive interference for selectively illuminating a portion of the object, the at least one element having a dimension with a size in a range of 100 nm-10 µm, wherein the controller is configured to sequentially change the interference pattern in relation to the object such that different portions are illuminated, and wherein the array of light-sensitive areas is configured to sequentially detect light from different portions of the object.

2. The imaging apparatus according to claim 1, wherein the illumination waveguide is monolithically integrated on the substrate on which the array of light-sensitive areas is formed.

3. The imaging apparatus according to claim 1, wherein the interference pattern comprises a plurality of elements, and wherein the illumination waveguide is arranged in relation to the array of light-sensitive areas such that a first point spread function on the array of light-sensitive areas based on illumination by a first element in the plurality of elements does not overlap with a second point spread function on the array of light-sensitive areas based on illumination by a second element in the plurality of elements adjacent to the first element.

4. The imaging apparatus according to claim 1, further comprising a bottom cladding layer between the illumination waveguide and the array of light-sensitive areas for controlling total internal reflection of light propagating in the illumination waveguide.

5. The imaging apparatus according to claim 1, further comprising a filter arranged above the array of light-sensitive areas for rejecting an excitation wavelength propagating through the illumination waveguide and passing a fluorescence wavelength of fluorescence induced by the object being illuminated.

6. The imaging apparatus according to claim 1, further comprising a top cladding layer above the illumination waveguide for controlling total internal reflection of light propagating in the illumination waveguide, wherein an opening is formed in the top cladding layer in relation to a measurement position for imaging the object.

7. The imaging apparatus according to claim 1, further comprising at least one input waveguide arranged on the common substrate, wherein the at least one input waveguide is configured to input a light wave into the illumination waveguide, and wherein the imaging apparatus further comprises at least one influencing device for tuning at least one of a phase or wavelength of light in the at least one input waveguide.

8. The imaging apparatus according to claim 1, wherein the illumination waveguide is a planar waveguide having an extension for enabling the interference pattern to be formed in the waveguide over an area imaged by the array of light-sensitive areas.

9. The imaging apparatus according to claim 1, wherein the controller is configured to sequentially change the interference pattern in relation to the object for scanning the at least one element of the interference pattern in relation to the object.

10. The imaging apparatus according to claim 1, wherein the imaging apparatus comprises one or more illumination waveguides configured to propagate two or more light waves of a first wavelength and a second wavelength by total internal reflection, wherein the controller is configured to control forming of a first interference pattern for the first wavelength and a second interference pattern for the second wavelength, wherein the first wavelength is different from the second wavelength.

11. The imaging apparatus according to claim 1, wherein the controller is configured to synchronize change of the interference pattern with a frame rate of the array of light-sensitive areas.

12. The imaging apparatus according to claim 1, further comprising a processing unit configured to receive a sequence of frames from the array of light-sensitive areas and to reconstruct an image of the object based on the sequence of frames with a resolution based on the size of the at least one element.

13. The imaging apparatus according to claim 1, wherein the array of light-sensitive areas is arranged on the substrate such that the array of light-sensitive areas is configured to receive light from the object through back-side illumination.

14. A system for nucleic acid sequencing, comprising the imaging apparatus according to claim 1.

15. A method for imaging of an object, the method comprising:
    transporting one or more light waves by total internal reflection through an illumination waveguide for illuminating an object in close relation to the illumination waveguide by an evanescent field of the one or more light waves, wherein the one or more light waves form an interference pattern in the illumination waveguide, the interference pattern comprising at least one element of constrictive interference for selectively illuminating a portion of the object to define a resolution of imaging, the at least one element having a dimension with a size in a range of 100 nm-10 µm;
    receiving light from the object by an array of light-sensitive areas, wherein the array of light-sensitive areas is arranged on a common substrate with the illumination waveguide such that the array of light-sensitive areas is configured to receive light from a first portion of the object; and
    changing the interference pattern in relation to the object such that different portions of the object are illuminated and the array of light-sensitive areas detects light from different portions of the object.

16. The method according to claim 15, wherein the interference pattern comprises a plurality of elements, and wherein the illumination waveguide is arranged in relation to the array of light-sensitive areas such that a first point spread function on the array of light-sensitive areas based on illumination by a first element in the plurality of elements does not overlap with a second point spread function on the array of light-sensitive areas based on illumination by a second element in the plurality of elements adjacent to the first element.

17. The method according to claim 15, wherein changing the interference pattern comprises tuning at least one of a phase or wavelength of the one or more light waves in the illumination waveguide.

18. The method according to claim 15, wherein transporting the one or more light waves through the illumination waveguide comprises transporting two or more light waves of a first wavelength and a second wavelength by total internal reflection wherein the first wavelength is different from the second wavelength.

19. The method according to claim 18, further comprising forming of a first interference pattern for the first wavelength and a second interference pattern for the second wavelength.

20. The method according to claim 15, wherein changing the interference pattern comprises synchronizing the changing of the interference pattern with a frame rate of the array of light-sensitive areas.

\* \* \* \* \*